Oct. 1, 1957 M. VOEGE 2,808,552
INDUCTION MOTOR AND CONTROL
Filed April 5, 1954
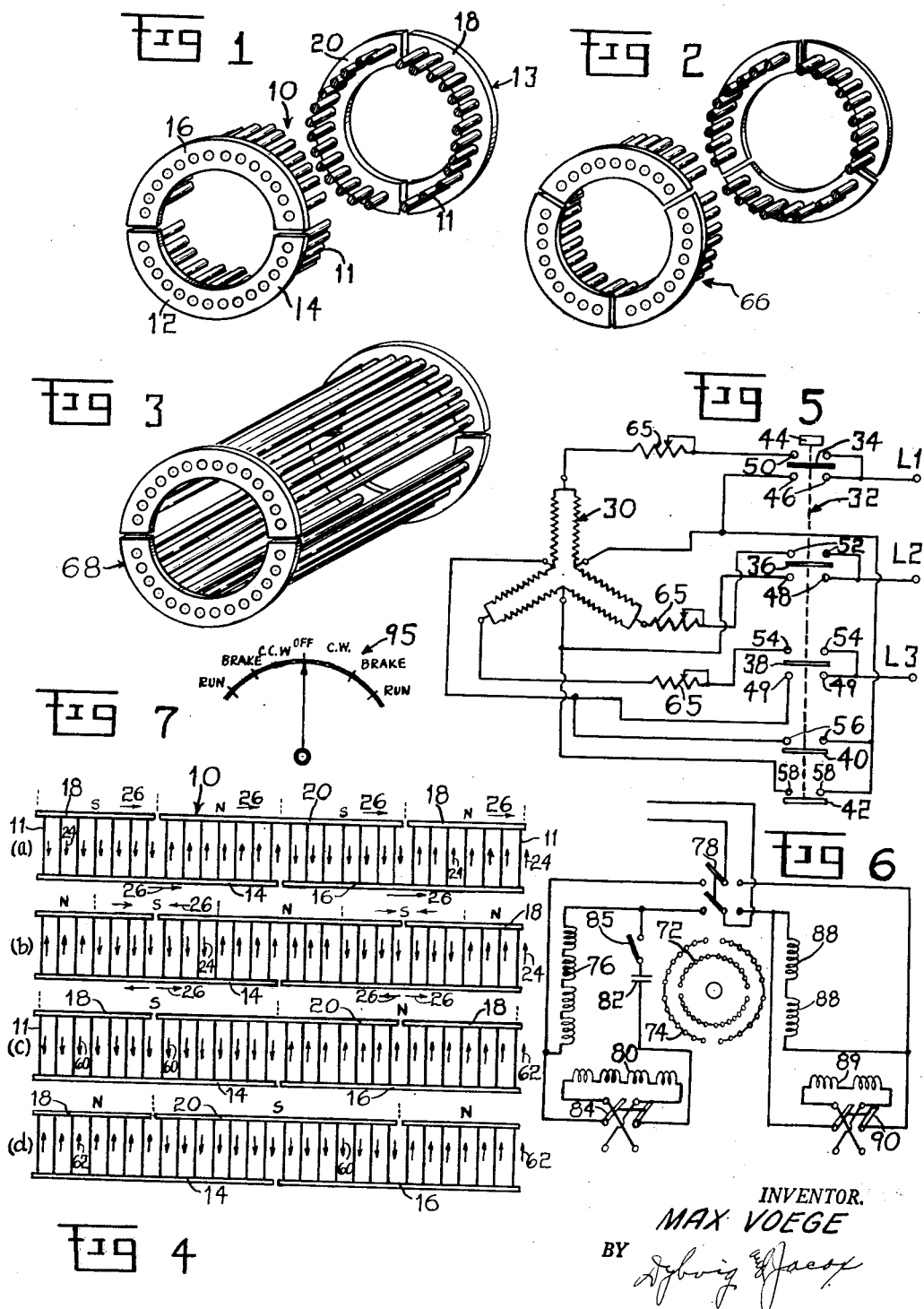
INVENTOR.
MAX VOEGE
BY
HIS ATTORNEYS

# United States Patent Office 2,808,552
Patented Oct. 1, 1957

2,808,552

INDUCTION MOTOR AND CONTROL

Max Voege, Dayton, Ohio, assignor to Everett P. Larsh, Dayton, Ohio

Application April 5, 1954, Serial No. 420,979

9 Claims. (Cl. 318—211)

This invention relates to an induction motor and control. It relates more particularly to an induction motor which is capable of high rates of deceleration when energization of the stator winding is properly controlled.

The invention relates more particularly to an induction motor provided with a rotor of the squirrel cage type which has normal operating characteristics during running operation thereof but which may be stopped quickly by a conventional stator winding.

An object of the invention is to provide an induction motor for use as a braking motor, the invention being applicable to either a polyphase or single phase induction motor.

Another object of the invention is to provide a motor having a rotor of the squirrel cage type which has normal operating characteristics during running operation but which rotor bars do not pass substantial current if a predetermined magnetic pole relationship is established in the rotor by the stator winding.

A further object of the invention is to provide a rotor for an induction motor, which rotor is of the squirrel cage type in which the end rings thereof are split into a plurality of sections, the arrangement of the sections being according to a predetermined pattern.

A further object of the invention is to provide a motor having a squirrel cage rotor which squirrel cage may be caused to be practically electrically non-effective while eddy currents are induced in the iron core of the rotor by proper energization of the stator of the motor.

A further object of the invention is to provide a squirrel cage rotor which is capable of rapid deceleration which rotor also has good operating characteristics.

Another object of the invention is to provide a braking motor which does not require excessive currents during the braking operation.

Other objects and advantages reside in the construction of parts, the combination thereof and the mode of operation, as will become more apparent from the following description.

In the drawing, Figure 1 is a fragmentary perspective view of a squirrel cage of a rotor of an induction motor and control made according to this invention, the squirrel cage being applicable for use in a four-pole motor.

Figure 2 is a fragmentary perspective view disclosing a squirrel cage portion of an induction motor rotor made according to this invention, the rotor being applicable for use in a six-pole motor.

Figure 3 is a perspective view disclosing a modification in a squirrel cage portion of an induction motor rotor made according to this invention for use in a four-pole motor.

Figure 4 is a diagrammatic view showing current flow within a squirrel cage portion of a rotor as shown in Figure 1.

Figures 4(a) and 4(b) indicate current flow in the cage portion of the rotor when four poles are established within the rotor by a stator winding.

Figures 4(c) and 4(d) disclose possible current relationships within the cage portion of the rotor shown in Figure 1, when two poles are established within the rotor by a stator winding.

Figure 5 is a schematic wiring diagram of a two-speed polyphase induction motor stator winding and control therefor operable with a motor having a rotor made according to this invention.

Figure 6 is a schematic wiring diagram disclosing a possible control arrangement used in a single phase, reversing and braking motor made according to this invention.

Figure 7 discloses a control station for use with a motor and control such as shown in Figure 6.

Referring to the drawings in detail, the squirrel cage portions of rotors shown in Figures 1, 2 and 3 are mounted within conventional iron core rotors (not shown). All of the rotors provided with squirrel cage portions according to this invention operate with normal running characteristics if the proper magnetic pole relationship is established by the stator portion of the motor.

A rotor cage 10 shown in Figure 1 is provided with a plurality of current carrying bars or conductors 11. These conductors 11 are fixedly attached to end rings 12 and 13 in any conventional manner.

Each of the end rings 12 and 13 is formed in two sections, the sections of end ring 12 being indicated by reference numerals 14 and 16, and the sections of the end ring 13 being indicated by reference numerals 18 and 20. The two sections of each end ring 12 and 13 are separated one from the other. They are separated in that current cannot flow directly from one section of an end ring to another section of the same end ring, but current can flow only by traversing the conductor bars 11 between a section of one end ring and a section of an opposite end ring. As shown in Figure 1, the separation of one end ring is disposed 90 degrees with respect to the separation of the opposite end ring. Thus, the rotor bars 11 attached to the end ring section 14 are also attached at the other end thereof to the sections 18 and 20, and the rotor bars 11 which are attached to the sections 16 of the end ring 12 are also equally divided between sections 18 and 20 of the end ring 13 and are attached thereto. In the example shown in Figure 1 of a rotor cage designed for operation with a four-pole stator, there are shown twenty-eight rotor bars, so that each end ring section attaches to fourteen rotor bars. Thus, half of the fourteen bars attached to each section of each end ring are attached at the other end thereof to one section of the opposite end ring, and the other half of the fourteen bars attached to each section are attached at the other end thereof to the other section of the opposite end ring. It will be understood that any of the rotor cages made according to this invention may be provided with any suitable number of conductor bars. The plurality of conductor bars shown in each of the rotor cages in the drawing is an arbitrary number for purposes of illustration.

Figure 4 comprises four laid-out views of the squirrel cage 10 shown in Figure 1 showing current flow in its twenty-eight conductor bars 11. If a rotor, provided with a cage portion 10 such as shown in Figure 1, is placed within a motor having a four-pole stator, when the four poles of the stator are energized, the four-pole relationship may be established within the rotor in a manner such as is shown in Figures 4(a) and 4(b).

Figures 4(a) and 4(b) show two possible instantaneous positions of the four poles established in the stator 10 and the current flow therein created by a four-pole stator winding.

As indicated by the arrows 24 in Figures 4(a) and 4(b), the currents induced in the rotor bars 11 by the four stator poles are free to circulate to provide normal rotor torque. The currents being in opposite axial direction under adjacent poles, the sectioned end rings do not obstruct the flow of current through the rotor bars. This is due to the fact that the currents can always find a path through an end ring to one of the adjacent poles. Regardless of the instantaneous position of the rotating flux of the four poles, the induced currents in the rotor bars flow freely, and currents flow in the end rings as indicated by arrows 26.

A typical three-phase two-speed constant torque stator winding 30, such as shown in Figure 5, may be controlled by a multipolar switch 32 having movable contacts 34, 36, 38, 40 and 42. This stator winding 30, if used in a conventional motor, would provide either four-pole or two-pole running operation. The multipolar switch 32 is operable by means of a handle member 44. The circuit shown in Figure 5 gives normal running operation with the four-pole connection and gives braking operation with the two-pole connection. During running operation of the motor having the stator winding 30 of Figure 5 and a rotor 10 such as disclosed in Figures 1 and 4, the switch 32 is in a downward position so that stationary contacts 46, 48 and 49 are engaged by the movable contacts 34, 36 and 38 respectively.

When it is desired to stop rotation of the rotor of the motor, the handle 44 is moved upwardly so that the movable contacts 34, 36, 38, 40 and 42 engage stationary contacts 50, 52, 54, 56, and 58. When the switch 32 is in the downward position, the four-pole winding circuit of stator winding 30 is energized from power supply lines L1, L2, and L3. When the switch 32 is moved to its upward position, the two pole stator winding circuit is energized from the power supply lines L1, L2, and L3. Considering the standard diagram for three phase motor connections, it is noted that when the two pole connection of the stator winding 30 is energized, the phase rotation applied to the winding 30 is in a reverse direction from the phase rotation applied through the four pole winding connections. Thus, the rotation of the revolving two pole flux is in the opposite direction from the direction of rotation of the rotor 10 during normal operation thereof. Two poles are established in the rotor 10 as diagrammatically indicated by Figures 4(c) and 4(d). These Figures 4(c) and 4(d) show two possible instantaneous positions of the two poles established in the stator 10 and show attempted current flow therein created by the two pole stator winding.

Due to the fact that the end rings 12 and 13 of the rotor cage 10 are divided into two separated sections, currents which may be induced by the two pole flux cannot flow when the poles are established as shown in Figures 4(c) and 4(d). The end rings 12 and 13 are so separated that current which would be induced by the two pole flux in one direction in the conductor bars cannot pass the end ring to return under the adjacent pole in the opposite direction, thereby, the induced voltages are rendered substantially ineffective. In other words, no substantial current can flow in the rotor bars when the two-pole stator winding is energized due to the fact that current attempting to flow under one pole in one axial direction cannot return under a pole of the opposite direction since it finds no passage through the sectioned end rings. In every position of the rotor, the end rings present an obstruction to flow of current induced by the two-pole stator winding.

Downwardly pointed arrows 60 and upwardly pointed arrows 62 in Figures 4(c) and 4(d) indicate possible induced currents in the rotor bars 11. These currents cannot flow at the instant indicated by Figure 4(c), due to the fact that poles are established which completely and exactly span the sections 14 and 16 of end ring 12. These sections 14 and 16 are separated, one from the other, so no current can flow between them. Hence, no current can flow in the rotor bars.

In Figure 4(d) is shown the current conditions existing when two poles established in the rotor 10 completely and exactly span sections 18 and 20 of the end ring 13. Due to the fact that these sections 18 and 20 are separated one from the other, no current can flow between them and hence no current can flow in the rotor bars. There may be a slight circulation of current in the rotor bars 11 when the two poles established in the rotor do not exactly span the sections of one of the rings. However, this current circulation is very small in that the flow is within only a few bars 11 connected by common end ring sections and lying at the junction of adjacent poles.

As shown in Figure 5 and as stated above, the rotation of the two-pole flux is in the opposite direction from the rotation of the four-pole flux which is established during normal operation of the motor. Hence, when the winding 30 is energized to create a two-pole flux, the stator field produces a revolving field opposite the rotation of the rotor and the motor stops quickly without drawing excessive currents. An impedance 65 may be connected in each line used in the two-pole stator connections to adjustably limit the flow of current during braking action and to thus control the rate of deceleration of the rotor during braking action. The reason for the rapid deceleration and quick stop is as follows: the two-pole rotor flux is in a direction opposite to the direction of the revolving rotor flux during normal operation of the motor. Furthermore, the rotation of the revolving two-pole flux is at a higher rate than the rotation of the revolving four-pole flux during normal operation. When the motor is running normally under four-pole operation and is then switched to two-pole operation in the opposite direction, a revolving field opposite the direction of rotor rotation is produced. This causes the iron of the rotor core to be cut at a high rate of speed by magnetic flux lines. As discussed above, the sectioned end rings permit only very small amounts of current to circulate in the rotor bars. However, the high rate at which the two-pole flux is cutting the rotor iron core gives rise to the flow of eddy currents in the rotor core which resist rotation of the rotor and effect rapid stopping of the rotor.

The small amounts of current which flow in the rotor bars also aid in stopping of the rotor without causing large amounts of current to be drawn from the power supply lines. The braking action is high at the beginning of the braking when the rotor is at full speed in the direction of normal operation. The braking action decreases as the rotor speed decreases. At zero speed the tendency of the rotor to reverse is so very slight that the load normally driven by the motor and mechanically coupled to the rotor is sufficient to hold the rotor from reversing. As is readily realized, the torques established in a rotor made according to this invention cannot be great at zero speed due to the fact that under two-pole operation only very small amounts of current are permitted to flow in the rotor bars.

Figure 2 discloses a rotor cage 66 which is applicable for use in a six-pole motor. A rotor which is provided with the cage 66 shown in Figure 2 has three equal sections included in each end ring. The sections of one end ring are angularly displaced 60 degrees with respect to the sections of the other end ring. This cage 66 is normally operable when six poles are established in the rotor by the stator. The six-pole motor provided with such a rotor will operate in a normal manner within a six-pole stator winding. However, when a two-pole stator flux is established in such a rotor, very small amounts of current are permitted to flow in the rotor bars. This condition is similar to that discussed with respect to the four-pole arrangement of rotor cage 10 illustrated in Figures 1 and 4. The control of the winding may be similar to that or Figure 5 or the control may be any other suitable system which provides a revolving flux having a given number of poles for rotation in one direction and a revolving flux having a lesser number of poles for rotation in the opposite direction.

A rotor cage 68, which is shown in Figure 3, has its two end rings sectioned in the same plane. Thus, the rotor winding comprises two half-cages which are completely insulated from each other. Therefore, no current may flow between the two half-cages. In four-pole operation of such a rotor cage, full load currents can circulate within each of the half-cages. However, when a two-pole flux is established in the rotor cage 68, whenever the pole pitch exactly spans one of the sections, no current can flow due to the fact that the current in one section tends to flow in one direction and the current in the other section tends to flow in the other direction. Each direction of current flow is prohibited due to the fact that the two half-cages are insulated one from the other. Hence, the rotor cage 68, as shown in Figure 3, is capable of normal operation in a four-pole motor and may be quickly stopped by a two-pole flux in a manner above described with respect to the rotor cages of Figures 1 and 2.

As shown in Figures 1, 2 and 3, rotors may be provided for either four-pole operation or for six-pole operation. Rotor cages may also be provided, according to this invention, for any number of poles. When it is desired to stop the motor, the stator winding is connected through suitable switching means so that a higher speed winding is energized and the connection is such that flux rotation is in the opposite direction from the flux rotation during normal running operation.

As diagrammatically shown in Figure 6, a single-phase motor may be operated with a rotor made according to this invention so that the single-phase motor may be quickly decelerated when running in either direction. Shown in Figure 6 is a rotor cage 70 having a sectioned end ring 72 at one end thereof and a sectioned end ring 74 at the other end thereof. For purposes of illustration, the end ring 72 is shown concentric with the end ring 74. The separation of one end ring is 90 degrees displaced with respect to the separation of the other end ring, making the rotor cage 70 normally operable in a four-pole motor and is similar to the rotor cage 10 of Figure 1.

In Figure 6, a four-pole main stator winding 76 may be energized by means of a switch 78. An auxiliary winding 80, electrically displaced with respect to the winding 76 by means of a capacitor 82, may be connected into the circuit by means of a reversing switch 84 and a single-pole switch 85 which may comprise a centrifugally operating switch mechanically attached to the motor shaft. When it is desired to stop the motor having the rotor cage 70 shown in Figure 6, the switch 78 is employed to energize a two-pole main braking winding 88 and an auxiliary braking winding 89 as the four-pole running windings 76 and 80 are de-energized. The main braking winding 88 and the auxiliary braking winding 89 are energized for stopping of the rotor having the cage 70 regardless of the direction of the operation of the motor. It is only necessary to reverse energization of the auxiliary braking winding 89 for stopping either direction of rotation. A reversing switch 90 is employed to control the direction of energization of the auxiliary winding 89 with respect to the main winding 88.

Either a polyphase motor or a single-phase motor made according to this invention is operable in either direction for running and for braking. Any conventional two-speed control circuit, such as shown in Figure 5, may also be employed for reversal of rotation by reversal of two of the line leads L1, L2 or L3. A control station 95 used in a circuit, such as shown in Figure 6, is disclosed in Figure 7 in which is shown an "off" position, a position for operation of the motor in either direction of rotation, and a position for braking the motor from rotation in either direction.

As is readily understood, any conventional induction motor stator connectible for two-speed operation may be employed for use with a rotor having a cage made according to this invention. The stator may have a two-speed winding which is connectible through external connections, such as the winding 30 shown in Figure 5, or the stator may have a winding for one speed and another complete winding for another speed. For the best stopping characteristics, it has been found that a two-pole winding is most satisfactory for the braking operation of the motor. For purposes of illustration, a two-Y/delta connected stator winding is shown in the drawing. However, a delta connected winding, a Y connected winding, or other types of connections may also be used. The rotor slots may be either parallel to the shaft or the rotor slots may be skewed.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a motor comprising a stator having a main field winding arranged to establish a given number of magnetic poles, the stator also being provided with a second winding arranged to establish a lesser number of magnetic poles, a rotor provided with end rings joined by a plurality of conductor bars, each end ring comprising a plurality of sections, each section of each end ring being permanently and continuously electrically separated from the other sections of the end ring, means for controlling energization of said main winding causing rotating magnetic flux in one direction, and means for controlling energization of said second winding of the stator causing rotating magnetic flux in the reverse direction.

2. In a motor comprising a stator having a main field winding arranged to establish a given number of magnetic poles, the stator also being provided with a second winding arranged to establish a lesser number of magnetic poles, a squirrel cage type of rotor provided with a pair of end rings, each end ring having an equal number of sections, each section of each ring being permanently and continuously electrically separated from the other sections of the ring, the sections of one ring being displaced at different radial angles from the sections of the other ring, means for controlling energization of said main winding of the stator causing rotating flux in one direction, and means for controlling energization of said second winding of the stator causing rotating flux in the reverse direction.

3. In an alternating current motor, a stator provided with a winding having a given number of poles, the stator winding having connections establishing a lesser number of poles than the given number of poles, and a rotor provided with a pair of end rings having a plurality of sections, each section of each of the end rings being permanently and continuously insulated electrically from the other sections of the end ring, the number of sections of the two end rings being equal to the given number of poles, a plurality of rotor bars disposed between the pair of end rings, the rotor bars being attached adjacent the ends thereof to the end rings, the sections of the end rings being displaced in angular relationship so that the rotor bars which are attached at one end thereof to each section are also attached at the other end of the bars to two sections of the opposite end ring.

4. In a single phase motor comprising a stator provided with a first stator winding having a given number of poles, a second stator winding having a lesser number of poles, and a rotor including a pair of sectioned end rings joined by a plurality of conductor bars, each section of each end ring being permanently and continuously insulated electrically from the other sections of the end ring so that current flow from one section of the end ring to other sections thereof is through conductor bars, the total number of sections of the two end rings being equal to the number of poles of the first stator winding, the bars attached to each section being connected to a plurality of sections of the opposite end ring.

5. An induction motor including a rotor comprising a rotatable cylindrical iron core having a plurality of longitudinal slots therein, a current carrying bar positioned in each of the slots, each bar extending substantially the length of the iron core, a pair of circular end rings connected to the bars at the ends thereof, the end rings at each end of the iron core having a plurality of separations sectionalizing the end rings into a plurality of substantially equal sections, each section of each end ring being permanently and continuously insulated electrically from the other sections of the end ring so that current flow from one section of the end ring to the other sections thereof is through conductor bars, the separations of one end ring being angularly disposed with respect to the separations of the other end ring, a stator provided with winding means establishing a given number of magnetic poles, the stator also having winding means establishing a lesser number of magnetic poles than the given number of magnetic poles, the given number of magnetic poles of the stator winding means being equal to the total number of sections of the two end rings.

6. An induction motor, a rotor core, a cage attached to the rotor core, the cage comprising a plurality of end plates at each end of the rotor core, each end plate at each end of the cage being permanently and continuously electrically insulated from the other end plates at that end of the cage, and a plurality of conductor bars joining a plurality of the end plates at one end of the rotor core to an end plate at the other end of the rotor core, the bars attached to each end plate being substantially equally distributed between two end plates at the other end of the rotor core, a stator, the stator being provided with winding means establishing a given number of magnetic poles, the stator also being provided with winding means establishing a lesser number of magnetic poles than the given number, the given number of magnetic poles of the stator winding being equal to the total number of end plates of the rotor cage.

7. In an alternating current motor comprising a pair of members having relative rotary movement, one of said members including a pair of sectioned end rings, each end ring having a plurality of sections permanently insulated electrically from the other sections of the end ring, a plurality of conductor bars joining the pair of end rings, the other of said members including a running winding adapted to establish a given number of magnetic poles and a braking winding adapted to establish a lesser number of magnetic poles, means for separately energizing the running winding with electrical energy of a given phase rotation, and means for energizing the braking winding with electrical energy of the reverse phase rotation.

8. In an alternating current motor, a stator, stator winding means arranged to establish a given number of magnetic poles, the stator winding means also being arranged to establish a number of magnetic poles different from the given number, and a squirrel cage type of rotor, the rotor including a pair of end rings, each of the end rings having a plurality of permanently and continuously electrically separated sections, the total number of end ring sections in each end ring being equal to one-half the given number of magnetic poles established by the stator winding means.

9. In an alternating current motor comprising a stator provided with stator winding means arranged to establish a given number of magnetic poles, the stator winding means also being arranged to establish a lesser number of magnetic poles, and a rotor including a plurality of conductor bars and a pair of end rings, there being an end ring at each end of the conductor bars, each of the end rings having a plurality of sections, each section of each end ring being permanently electrically insulated from the other sections of the end ring so that current flow from one section of the end ring to the other sections thereof is through conductor bars, the total number of sections of the two end rings being equal to the given number of magnetic poles established by the stator winding means.

References Cited in the file of this patent

UNITED STATES PATENTS

| 919,524 | Barnholdt | Apr. 27, 1909 |
| 931,302 | Hellmund | Aug. 17, 1909 |
| 1,013,753 | Dunn | Jan. 2, 1912 |
| 1,183,548 | Forbes | Feb. 21, 1913 |
| 1,185,461 | Alexanderson | May 30, 1916 |
| 2,037,532 | Morrill | Apr. 14, 1936 |
| 2,490,181 | Weathers | Dec. 6, 1949 |

FOREIGN PATENTS

| 95,974 | Austria | Feb. 11, 1928 |
| 359,207 | Great Britain | Oct. 27, 1931 |
| 552,428 | Germany | June 15, 1932 |